July 11, 1950  H. S. RITZEL  2,514,900
MOTORCYCLE AND SIDE FRAME
Filed April 19, 1946  2 Sheets-Sheet 1
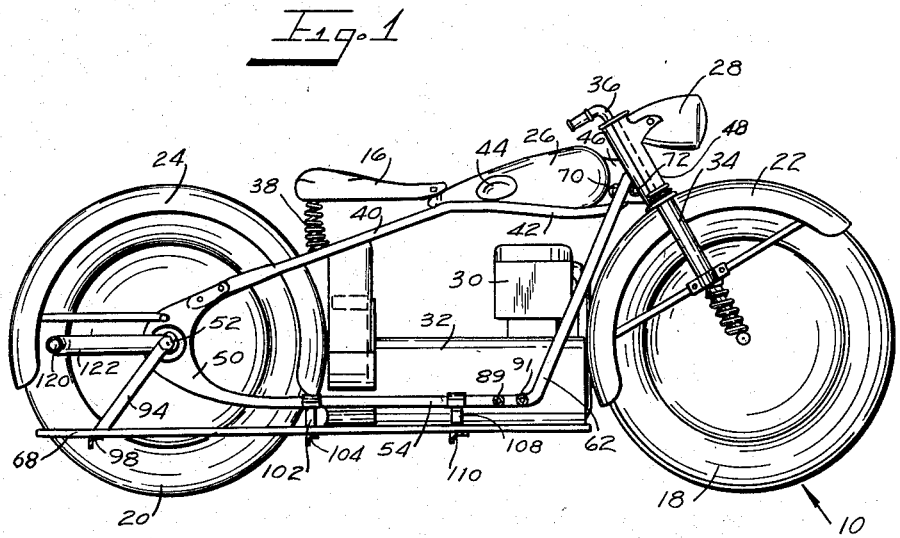
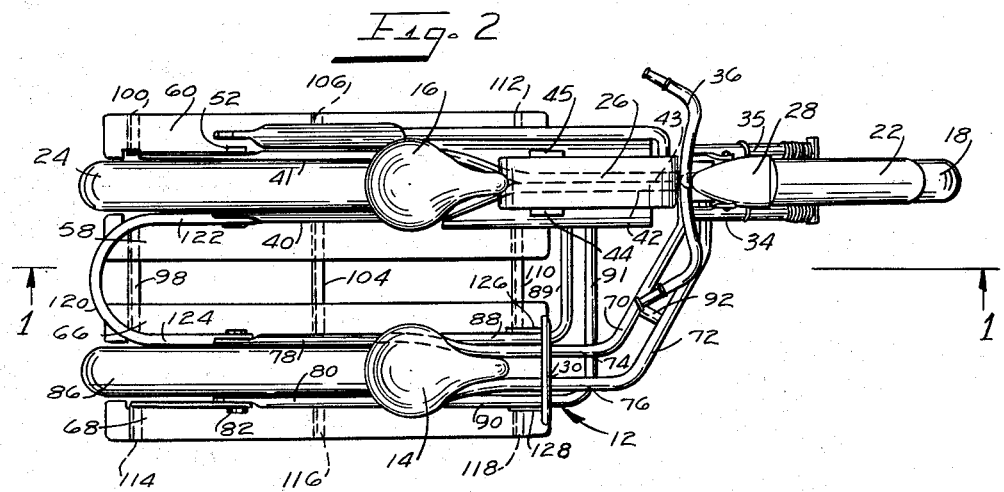
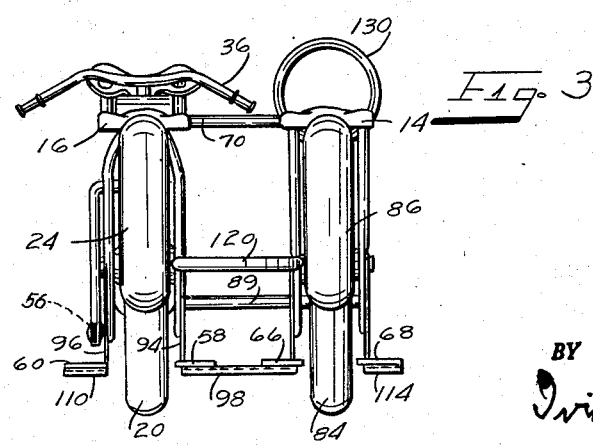
INVENTOR.
HENRY S. RITZEL
BY
Irving F. Goodfriend
ATTORNEY July 11, 1950     H. S. RITZEL     2,514,900
MOTORCYCLE AND SIDE FRAME
Filed April 19, 1946     2 Sheets-Sheet 2
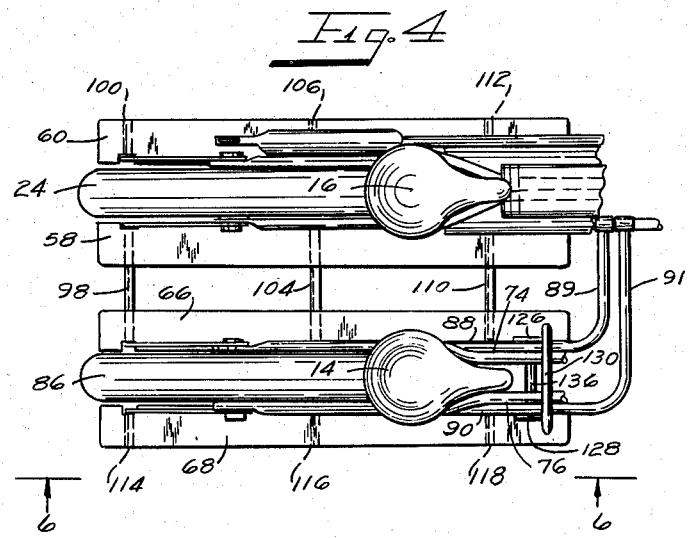
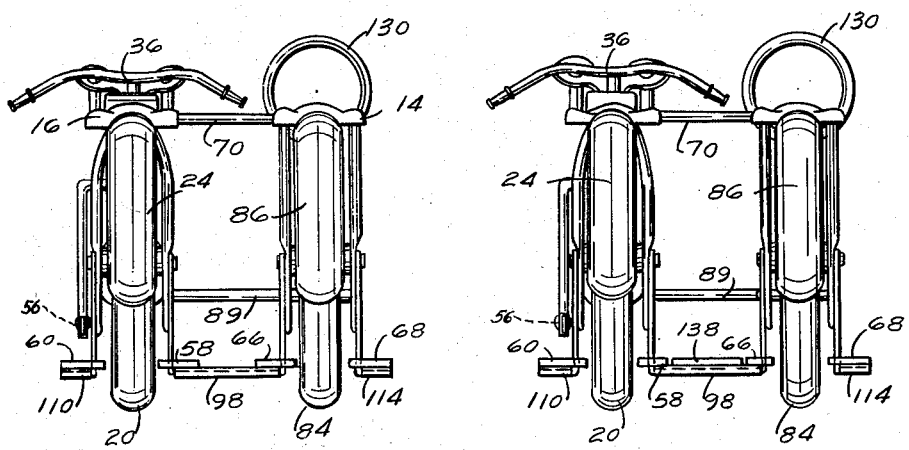
INVENTOR.
HENRY S. RITZEL
BY Irving F. Goodfriend
ATTORNEY Patented July 11, 1950

2,514,900

UNITED STATES PATENT OFFICE 2,514,900

MOTORCYCLE AND SIDE FRAME

Henry S. Ritzel, New York, N. Y.

Application April 19, 1946, Serial No. 663,579

8 Claims. (Cl. 280—203)

This present invention relates to a motorcycle and more particularly to its combination with a side frame for carrying an additional passenger astride the side frame substantially at the side of the motorcycle drive.

Heretofore, in one embodiment of prior art motorcycles, the passenger was seated in a carrying means, conventionally known as a "side car," which was mounted and supported between the rear wheel of the motorcycle and an added wheel parallel to the motorcycle rear wheel, thus placing the passenger alongside the wheels in a somewhat low, underslung position.

This conventional arrangement had certain disadvantages. The rider was seated in such manner that he was unable to raise himself in preparation to absorb the unavoidable shocks resulting from a rough road surface over which the motorcycle might be driven.

The present invention on the other hand, provides a frame to seat astride it an additional rider so constructed that the rider may brace himself against such shocks substantially in the same manner as the driver of the motorcycle is able to do, which the passenger in the conventional side car is unable to do.

With the conventional side car arrangement, an additional passenger finds difficulty in mounting or dismounting from the car. In order to mount a fast moving vehicle of this kind, the prospective passenger must move substantially at right angles to the car and not in the same direction of motorcycle movement. The same condition is also encountered when the passenger dismounts from the conventional motorcycle side car since the passenger must then move away from it at right angles to the motion of the motorcycle. In either case, the passenger is required to change the direction of his movement from that of parallel to the direction of movement of the motorcycle (forward or backward) to a sidewise movement (at right angles to it).

Thus, when mounting the side car the passenger must of necessity encounter it in an off balance position and when dismounting from it the passenger will strike the ground also in an off balance position so that there is danger of a fall to the ground with resulting possible physical harm and damage to any equipment which he may be carrying.

Therefore, in that field where the great use of motorcycles and side cars will be had, namely, for military and police purposes requiring rapid and safe mounting and dismounting from a fast moving vehicle, the conventional side car is at a disadvantage.

The present invention therefore contemplates the provision of a structure from which a passenger may rapidly and safely mount or dismount the moving motorcycle with a motion parallel to the movement of the motorcycle. By such arrangement, the passenger can step off to the rear and decelerate easily and safely while still running in the original direction of travel as the vehicle moves away from him.

The disadvantages of the side car are encountered in the tricycle where the passenger is carried between the two rear wheels and faces toward the rear of the vehicle. With such machines, the passenger cannot readily dismount from the vehicle since he faces in the opposite direction to its travel and therefore, in order to properly balance himself when dismounting, the passenger must turn in the forward direction while the vehicle is moving, a somewhat difficult feat to accomplish on the small and slanting running board found in that type of vehicle, which of course does not have handle bars to be grasped and so provide the necessary support.

The present invention contemplates the provision of a structure on which the passenger is seated similar to the seating of the driver so that the passenger can be furnished knee pads as well as a handle bar or ring grip for use in mounting, dismounting and as a support while riding. Thus, the passenger may ride the motorcycle, mount it or dismount from it as easily and as conveniently as the driver can and with the same comfort.

The present invention also contemplates the provision of relatively lengthy foot boards (which may be considered vehicle running boards) for the passenger as well as the driver thus enhancing for both the ease and rapidity with which the machine may be mounted and dismounted.

These and other objects, advantages and uses of the present invention will be clear from the description which follows and the drawings appended thereto in which Fig. 1 is a section on the line 1—1 of Fig. 2.

Fig. 2 is a top plan view of a motorcycle and passenger seat side frame according to my invention.

Fig. 3 is a rear elevation thereof.

Fig. 4 is a partial top plan view of a modification of my invention.

Fig. 5 is a rear elevation thereof.

Fig. 6 is a side elevation on the line 6—6 of Fig. 4.

Fig. 7 is a rear elevation of a further modification of my invention.

Referring now to the drawings and more particularly to Figs. 1 to 3, a conventional motorcycle 10 has mounted on it a frame structure 12 astride which a passenger may be carried on the seat 14 and which seat 14 is preferably in alignment with and parallel to the seat 16 on which the motorcycle driver is carried.

The motorcycle has the usual conventional elements including the front and rear wheels 18 and 20, with their accompanying mud guards 22 and 24, the tank 26, the light 28, motor 30, transmission 32, steering posts 34 and 35, handle bars 36, etc. The seat 16 is supported at one end on the tank 26 and at the other end by means of the spring 38 to the inside and outside downwardly inclined tubular elements 40 and 41 of the motorcycle frame, the tank 26 being mounted on the substantially horizontal inside and outside tubular elements 42 and 43 of the frame.

Mounted on the tank 26 are provided the conventional knee pads 44 and 45 on each side of the tank which give riding comfort to the motorcycle driver enabling him to brace himself when required.

The motorcycle frame includes the horizontal elements 42 and 43 on which the tank saddle or support 46 is cradled and which saddle or support is secured to the steering post collar 48 and the downwardly inclined tubular elements 40 and 41 which latter are bolted or riveted to the fork 50. The fork 50 is mounted on the axle 52 of the rear wheel 20.

Bolted or riveted to the fork 50 are the lower horizontal tubular inside member 54 and outside member 56, on which, as will be described, are mounted the footboards 58 and 60 for the driver of the motorcycle.

The lower horizontal members 54 and 56 continue into the upright members 62 which at their ends are secured to the tank saddle or support 46 thus completing the motorcycle frame.

In order to form the cradle like frame 12 on which the passenger seat 14 and foot boards 66 and 68 are mounted, I secure the tubular elements 70 and 72 to the head lug or support 46 from which they extend outwardly and are bent rearwardly to permit adequate and proper turning of the wheel 18 when steering the motorcycle by thus removing them from the path of movement of the steering posts 34 and 35. The elements 70 and 72 continue into the horizontal inside and outside tubular members 74 and 76, which continue into the downwardly inclined elements 78 and 80, which latter are similar to the elements 40 and 41 and are also bolted or riveted to yoke members mounted on the axle 82 of the side frame wheel 84, which latter is also supplied with a mudguard 86.

Lower inside and outside horizontal tubular elements 88 and 90 are similarly bolted and riveted to the yoke members mounted on the axle 82 and continue into the lower inside and outside members 89 and 91 extending toward and secured to the lower inside member 54, thus completing the passenger carrying side frame 12.

The front end of the passenger seat 14 is cradled between the upper tubular elements 74 and 76 and the rear end of this seat connected by the spring 38 (for illustration see Fig. 6) to the downwardly inclined tubular elements 78 and 80.

If desired for rigidity, the members 70 and 72 may be connected by the rigid spacer arm 92.

In order to mount the footboards for the driver and the passenger respectively on the motorcycle frame and the side frame 12, I mount on the axle 52, the inclined inside and outside arms 94 and 96 to which are secured the angle supports 98 and 100.

Intermediate the motorcycle frame on the lower inside horizontal member 54, I mount the support 102 to which is secured the angle support 104 and on the outside horizontal member and in the same manner the angle support 106. Toward the front end of the motorcycle on the inside horizontal member 54, I mount the support 108 to which the angle support 110 is secured and on the outside horizontal support member and in the same manner the angle support 112.

Thus, the footboard 58 is rigidly carried on the angle supports 98, 104 and 110. The other ends of these angle supports are mounted in the same manner on the inside lower tubular member 88 of the passenger side frame 12 so that the footboard 66 is likewise rigidly carried on the same angle supports.

The other foot board 60 is rigidly mounted on the angle supports 100, 106 and 112 which are suspended from the outside yoke member and the outside lower horizontal element 56 in the same manner.

Mounted on the lower outside tubular element 90 of the passenger frame 12 in a similar manner, I provide angle supports 114, 116 and 118 on which the outside footboard 68 for the passenger is rigidly carried.

The angle 114 is carried by the arm 115 mounted on the axle 82, the angle 116 by the support 117 and the angle 118 by the support 119, the latter two supports fixed on the lower horizontal element 90 as illustrated in Fig. 6 relating to a modification of my invention.

In order to further rigidly connect the frame 12 to the motorcycle, I mount the member 120 on the axles 52 and 82 respectively by means of the arms 122 and 124 and in order that it will not interfere with ready dismounting, I bow the member 120 outwardly from the axles to the back of the machine.

Secured to the horizontal tubular members 74 and 76 in front of the seat 14, I mount, for the comfort of the passenger, the knee pads 126 and 128 and in order that the passenger may suitably hold and support himself on the seat 14, the ring or handle bar 130.

It will now be apparent that I have provided a passenger carrying frame on which a seat is mounted and on which the passenger may sit astride of the frame and the seat with his legs on suitable foot boards and his hands grasping a handle bar in front of him so that he (the passenger) may ride at the side of the motorcycle in the same manner that the driver does and in alignment with the driver to thus provide a well balanced machine.

My novel passenger side frame may be made particularly adaptable for police and military uses by eliminating the rigid bowed member 120 of the machine illustrated in Figs. 1 to 3 so that the passenger (who may be a police officer or soldier) may easily step to the rear off the frame 12 as the motorcycle moves in the forward direction. Such construction illustrated in Figs. 4 to 6, to which reference is now made and in which like elements bear like reference characters, eliminates the probable necessity of stepping over a member 120 as the passenger dismounts from the side frame 12 merely by stepping to the rear.

In this way, the passenger in dismounting strikes the ground with one foot to be followed by the next foot while facing in the same direction that the motorcycle is moving. In this way, the dismounting passenger is able to retain his balance as the motorcycle moves away from him when he dismounts and ready to face the impending field of action.

But for the elimination of the bowed member 120, the motorcycle illustrated in Figs. 4 to 6 is substantially the same as that illustrated in Figs. 1 to 3.

The frame upper members 74 and 76 may be connected by the spacer arm 136 in order to make the side frame more rigid. The knee pads 126 and 128 may be slidably mounted on the members 74 and 76 so that they may be adjustably positioned forwardly or rearwardly for a better fit.

Referring now to Fig. 7, I mount on the angle supports 98, 104 and 110 between the footboards 58 and 66, the intermediate structure or board 138, which serves as a platform or other structure for carrying any desired articles, such as luggage or police or military equipment or anything else to be transported by the motorcycle.

It will now be apparent that I have provided a passenger side frame which is so constructed and arranged that an extra rider is able to sit astride it and the seat mounted on it so that he may always face toward the front and is provided with both knee pads, a handle bar and foot boards by means of which he is able to brace and support himself to meet any unusual shocks encountered in driving.

It will be further apparent that I have provided a passenger side frame that will meet the services to which it will be subjected by police and military requirements.

While I have shown and described certain specific examples of my invention, it will be understood that such examples are illustrative and are not given as limitations, since other modifications within the spirit and scope of the invention will be apparent to those skilled in the art. Hence, I do not intend to limit myself thereto, but intend to claim my invention as broadly as may be permitted by the state of the prior art and the terms of the appended claims.

I claim:

1. In a machine of the character described, the combination with a motorcycle having a frame including lower inside and outside members disposed longitudinally of the motorcycle of a passenger side frame including lower inside and outside members and upper inside and outside members disposed longitudinally of the side frame, said lower members of the side frame connected to a member mounted on the motorcycle frame at the lower inside thereof and said upper members of the side frame connected to the motorcycle frame, a horizontally disposed foot board mounted on each side of the motorcycle on a lower inside member and a lower outside member of the motorcycle frame, a foot board mounted on each side of the side frame on a lower inside member and a lower outside member of the side frame, a driver's seat mounted on the motorcycle frame, a passenger seat mounted on the upper members of the side frame and at the side of the driver's seat for carrying the passenger astride the seat and the side frame and a handle support in front of the passenger seat and mounted on the upper members of the side frame, said horizontally disposed foot board extending from a point in front of the seats and adjacent the front wheel of the motorcycle to a point substantially in rear of the rear axle of the motorcycle whereby the driver and passenger may dismount from the machine to the rear thereof.

2. In a machine of the character described, the combination with a motorcycle having a frame including lower inside and outside members disposed longitudinally of the motorcycle of a passenger side frame including lower inside and outside members and upper inside and outside members disposed longitudinally of the side frame said lower members of the side frame connected to a member mounted on the motorcycle frame at the lower inside thereof and said upper members of the side frame connected to the motorcycle frame, a horizontally disposed foot board mounted on each side of the motorcycle on a lower inside member and a lower outside member of the motorcycle frame, a horizontally disposed foot board mounted on each side of the side frame on a lower inside member and a lower outside member of the side frame, said foot boards extending from the rear of the machine from a point in the rear of the rear axle of the machine longitudinally toward the front of the machine to a point adjacent and behind the front axle of the machine, a driver's seat mounted on the motorcycle frame, and a passenger seat mounted on the upper members of the side frame and at the side of the driver's seat for carrying the passenger astride the seat and the frame.

3. The machine of claim 2, a wheel on the side frame parallel to the rear wheel of the motorcycle and a bowed element rigidly connecting the axle of the motorcycle rear wheel with the axle of the side frame wheel, the bowed part of said bowed element positioned at the rear of and between the foot boards 4. In a machine of the character described, the combination with motorcycle having a frame of a side frame secured to the motorcycle frame and parallel thereto, an inside and outside horizontally disposed foot board mounted on the motorcycle frame and extending from the rear of the motorcycle toward the front thereof, an inside and outside horizontally disposed foot board mounted on the side frame and extending from the rear thereof to the front thereof and parallel to the motorcycle foot boards, a driver's seat mounted on the motorcycle frame and a passenger seat mounted on the side frame and at the side of the driver's seat for carrying the passenger astride the seat and the side frame said foot boards extending from the rear of the rear axle of the motorcycle beyond the driver's and passenger's seats in rear of the front axle of the motorcycle.

5. In a machine of the character described, the combination with a motorcycle having a frame of a side frame for a passenger, spaced members disposed longitudinally between the motorcycle frame and the side frame for connecting the side frame to the motorcycle frame, inside horizontally disposed longitudinal foot boards mounted on the members thereabove between the motorcycle frame and the side frame, an outer horizontally disposed longitudinal foot board mounted on the outside of the motorcycle, a second horizontally disposed longitudinal outer foot board mounted on the outside of the side frame, a driver's seat mounted on the motorcycle and a passenger seat mounted on the side frame, all of said foot boards extending from in front of the said seats to beyond the rear axles of the machine.

6. The combination of claim 5 and including upper members connecting the side frames to the motorcycle frame, said upper connecting members being positioned in front of said seats.

7. The machine of claim 2, a wheel on the side frame parallel to and aligned with the rear wheel of the motorcycle and a bowed element rigidly connecting the axle of the motorcycle rear wheel with the axle of the side frame wheel, said bowed element positioned between the motorcycle and the side frame, lower outside members extending from the motorcycle frame and from the side frame, said outer foot boards mounted on the last mentioned lower outside members thereabove whereby said outer foot boards are unobstructed at the rear thereof.

8. The machine of claim 2, said upper members being positioned in front of the seats.

HENRY S. RITZEL.

REFERENCES CITED

The following references are of record in the file of this patent:

UNITED STATES PATENTS

| Number | Name | Date |
|---|---|---|
| 636,155 | Mackay | Oct. 31, 1899 |
| 1,063,864 | Edwards et al. | June 3, 1913 |
| 1,068,835 | Bamford | July 29, 1913 |
| 1,172,995 | Hunter | Feb. 22, 1916 |
| 1,324,242 | Fisker | Dec. 9, 1919 |
| 1,473,956 | Eyre et al. | Nov. 13, 1923 |